United States Patent
Cox et al.

(10) Patent No.: US 10,628,539 B2
(45) Date of Patent: Apr. 21, 2020

(54) COMPUTING SYSTEM AND METHOD FOR DYNAMICALLY MANAGING MONTE CARLO SIMULATIONS

(71) Applicant: The Boeing Company, Chicago, IL (US)

(72) Inventors: Kelsea Cox, Harvest, AL (US); Lindsay L. Jones, Madison, AL (US); Robert M. Lawton, Huntsville, AL (US); Shelby E. Basham, Madison, AL (US); Jordan S. Falk, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 334 days.

(21) Appl. No.: 15/788,339

(22) Filed: Oct. 19, 2017

(65) Prior Publication Data

US 2019/0121922 A1   Apr. 25, 2019

(51) Int. Cl.
*G06F 17/10*   (2006.01)
*G06F 17/50*   (2006.01)

(52) U.S. Cl.
CPC ...... *G06F 17/5009* (2013.01); *G06F 2217/10* (2013.01)

(58) Field of Classification Search
None
See application file for complete search history.

(56) References Cited

U.S. PATENT DOCUMENTS

| | | | | |
|---|---|---|---|---|
| 2010/0325072 A1* | 12/2010 | Truemper | ............... | G06N 20/00 706/12 |
| 2011/0164517 A1* | 7/2011 | Shepherd | ............... | H04B 1/707 370/252 |
| 2012/0059641 A1* | 3/2012 | Castellini | ............... | G01V 99/00 703/10 |
| 2012/0290274 A1* | 11/2012 | Seningen | ............ | G06F 17/5036 703/2 |
| 2015/0030227 A1* | 1/2015 | Liang | .................... | G06T 11/006 382/131 |
| 2017/0139065 A1* | 5/2017 | Gentilhomme | ........ | G01V 1/282 |

\* cited by examiner

*Primary Examiner* — Rehana Perveen
*Assistant Examiner* — Cuong V Luu
(74) *Attorney, Agent, or Firm* — Alston & Bird LLP

(57) ABSTRACT

A computing system, method and computer program product dynamically manage Monte Carlo simulations. In a method, convergence criteria conditions are identified and a set of outcomes is generated following the repeated performance of one or more functions upon randomly sampled input parameter distributions. The method also determines whether the convergence criteria condition is satisfied based upon a plurality of samples. In an instance in which the convergence criteria condition is not satisfied, the method supplements the set of outcomes by repeatedly performing the one or more functions upon randomly sampled input parameter distributions. In an instance in which the convergence criteria condition is satisfied, the method determines whether the set of outcomes has been supplemented prior to satisfying the convergence criteria condition and, if the set of outcomes has not been supplemented, the size of the set of outcomes to be generated during a subsequent Monte Carlo simulation is reduced.

20 Claims, 4 Drawing Sheets

COMPUTING SYSTEM AND METHOD FOR DYNAMICALLY MANAGING MONTE CARLO SIMULATIONS

TECHNICAL FIELD

A computing system, method and computer program product are provided for dynamically managing Monte Carlo simulations and, more particularly, for managing Monte Carlo simulations so as to control the size of the set of outcomes to be generated during a Monte Carlo simulation in such a manner as to manage the computational efficiency associated with the Monte Carlo simulations, such as by maximizing the computational efficiency associated with Monte Carlo simulations in some embodiments.

BACKGROUND

Monte Carlo simulations are generally utilized to model the outcomes of complex functions, such as those that represent large scale complex engineering systems and processes, which cannot be efficiently modeled with traditional mathematical approaches. For example, the outcomes of some complex systems or processes cannot be efficiently predicted by traditional mathematical approaches due to the inclusion of random variables and/or the introduction of uncertainty with respect to at least some of the variables. In these situations, efforts to conduct an exhaustive numerical evaluation of the function is impossible or prohibitively slow and computationally extensive. Consequently, Monte Carlo simulation may be utilized to model the probability of the different outcomes from the complex system or process in order to permit the complex system or process to be analyzed.

Monte Carlo simulations utilize random samples of the varying and uncertain parameters of the functions representative of the large scale complex engineering systems and processes in order to explore the behavior of the complex system or process. Monte Carlo simulations permit analysis of the complex systems or processes by modeling the set of possible outcomes by substituting a range of values, such as a probability distribution, for one or more of the parameters or inputs of the function being evaluated. The Monte Carlo simulation randomly samples from the distribution representative of the parameter or other input and then performs the function or set of functions representative of the complex system or process utilizing the random sample to determine an outcome from the system or process. A Monte Carlo simulation repeatedly performs this process of randomly sampling from the distributions representative of the parameters or other inputs and then performing the function or set of functions representative of the complex system or method based upon the random samples in order to effectively span the input parameter space and capture the distribution of outcomes.

While Monte Carlo simulations may vary depending upon the application, Monte Carlo simulations typically define the variables or other parameters of a function or set of functions to be evaluated as well as the probability distributions associated with one or more of the variables or other parameters. The Monte Carlo simulation then generates inputs randomly from the probability distribution of each uncertain parameter or other input. The Monte Carlo simulation performs a deterministic computation, typically termed a "run", for a particular set of inputs in order to generate an outcome from the function or set of functions to be evaluated. The outcomes of each deterministic computation may then be aggregated to determine the statistical distribution of outcomes which may, in turn, be evaluated in order to investigate the performance of the function or set of functions representative of the complex system or process. While an effective modeling technique, Monte Carlo simulation may involve thousands or tens of thousands of deterministic computations, e.g., runs, prior to generating a representative set of outcomes that effectively model the complex system or process. The deterministic computations required for thousands or tens of thousands of runs during a Monte Carlo simulation can consume substantial computational resources and require significant time expenditure.

In order to perform a Monte Carlo simulation, the number of deterministic computations, such as generated outcomes or runs, must be defined in such a manner that the resulting set of outcomes is representative of the performance of the complex system or process. Thus, a person designing the Monte Carlo simulation advantageously has some understanding of the variation of the parameters or other inputs as well as the distribution associated with the each of the parameters or other inputs so as to estimate the number of deterministic computations required to span the input space and to generate a representative set of outcomes for the desired level of statistical confidence. In this regard, the number of samples drawn from the probability distributions associated with various parameters or other inputs must not only be sufficient to span the probability distribution of each individual parameter or other input, but also must be sufficient in number to span the combined input parameter space of the various parameters or other inputs having probability distributions associated therewith. As the number of parameters or other inputs having probability distributions associated therewith increases and/or as the variability associated with the various parameters or other inputs increases, the number of deterministic computations required for a Monte Carlo simulation to generate a set of outcomes that effectively represents a complex system or process correspondingly increases. In addition to the size of the input parameter space, complex relationships may exist between various parameters or other inputs to the function or set of functions being evaluated. These complex relationships compound the issues associated with determining the number of deterministic computations required by a Monte Carlo simulation in order to provide a statistically accurate analysis of the potential outcomes.

In instances in which the input parameter space and/or the relationship between the various parameters or other inputs to the function or set of functions being evaluated by a Monte Carlo simulation cannot be completely understood, the selection of the number of deterministic computations, that is, the number of runs, of a Monte Carlo simulation becomes more challenging and creates more risks that the resulting set of outcomes will not provide a statistically accurate portrayal of the complex system or process. Indeed, if the number of runs chosen for the Monte Carlo simulation is too small, the set of outcomes that is generated will be inaccurate and not provide a complete picture of the behavior of the complex system or process being evaluated. Conversely, if the number of runs of a Monte Carlo simulation is unnecessarily large, time and computational resources will be wasted.

For a typical Monte Carlo simulation, a user may estimate the number of runs that should be sufficient to generate a set of outcomes that permits a statistically accurate analysis of the complex system or process being modeled. Following the execution of the selected number of runs, the user may manually assess the set of outcomes to determine if additional runs should be performed. If so, the desired number of runs are performed including both the repeated performance of the runs that were previously performed as well as the performance of the additional runs and the user then again evaluates the set of outcomes. This trial-and-error method of determining the number of runs required for the set of outcomes of a Monte Carlo simulation to permit statistically accurate analysis of the complex system or process under evaluation may be time-consuming and computationally expensive. One drawback of this technique is that if additional input parameters are included, a change in the relationship between the input parameters is introduced or there is a change in variation of the input parameters, the user's a priori understanding of the minimum number of required runs is no longer valid. The reassessment of the number of runs of a Monte Carlo simulation that should be conducted in an instance in which additional or different input parameters are introduced, a change in the relationship between the input parameters is defined or there is a change in variation of the input parameters may be ignored and the user may improperly assume that the number of runs that was previously utilized for the prior Monte Carlo simulation having different input parameters or different relationships between the input parameters will also be adequate for a subsequent Monte Carlo simulation with a different number of input parameters and/or different relationships therebetween. Such an assumption is sometimes inaccurate and may result in a set of outcomes that does not permit a statistically accurate analysis of the underlying complex system or process.

The manual estimate as to the number of runs that should be conducted for an effective Monte Carlo simulation may generally result in one of four different scenarios. In a first scenario, too few runs are executed and the user concludes by analyzing the set of outcomes that additional runs are required in order to permit the complex system or process that is being modeled to be analyzed in a more statistically accurate manner. In this situation, the user determines the number of additional runs that should be conducted and the Monte Carlo simulation is again executed. This undesirably increases the time required for the Monte Carlo simulation as it must be initially commenced, the initial set of outcomes must be evaluated, the number of runs must be re-assessed and the Monte Carlo simulation must then be repeated for the additional number of runs. This iterative process may be repeated several times prior to having conducted a sufficient number of runs in order to permit a statistically accurate analysis of the complex system or method being modeled.

In a second scenario, the user also identifies an initial number of runs that are too few to generate a set of outcomes that permits the system or method to be analyzed in a statistically accurate manner. However, in this scenario, the user assumes or incorrectly assesses the initial set of outcomes and concludes that additional runs are not required. As a result of this incorrect determination, the set of outcomes does not permit a statistically accurate analysis of the complex system or process being modeled and the user may draw false conclusions from the set of outcomes. The user may be unaware of the inaccuracies and, as such, may communicate invalid conclusions relative to the system or method being modeled, thereby potentially leading to long-term programmatic consequences.

In a third scenario, the user initially identifies an excessive number of runs for the Monte Carlo simulation in an effort to insure statistically accurate results. While the set of outcomes that is generated does permit a statistically accurate analysis of the complex system or method being modeled, computational time and resources are wasted. In a fourth scenario, the user happens to identify the correct number of runs such that the set of outcomes generated by the Monte Carlo simulation permits a statistically accurate analysis of the complex system to process being modeled. In this scenario, the computational time and resource consumption are appropriate and the results are statistically accurate. However, the selection of the proper number of runs in this scenario generally does not happen very frequently and is not typically repeatable.

BRIEF SUMMARY

A computing system, method and computer program product are provided in accordance with an example embodiment in order to dynamically manage Monte Carlo simulations. The computing system, method and computer program product permit a number of runs of the Monte Carlo simulation to be performed that is sufficient to permit statistically accurate analysis of an underlying system or process that is being modeled, but do not require more runs than are necessary to generate the statistically accurate results. Thus, the reliability of the set of outcomes generated by the Monte Carlo simulation is enhanced, while conserving computational resources and time since the execution of an excessive number of runs of a Monte Carlo simulation may consume substantial computational resources and time. The conservation of computational time and resources by the computing system, method and computer program product of an example embodiment reliably and repeatedly generates statistically accurate results substantially improves the resulting computational efficiency of a Monte Carlo simulation.

In an example embodiment, a computing system is provided for dynamically managing Monte Carlo simulations. The computing system includes a memory device configured to store computer program instructions and processing circuitry configured to execute the computer program instructions. The processing circuitry, in response to execution of the computer program instructions, is configured to identify a convergence criteria condition. The processing circuitry is also configured to generate a set of outcomes following the repeated performance of one or more functions upon randomly sampled input parameter distributions. The processing circuitry is further configured to determine whether the convergence criteria condition is satisfied based upon a plurality of samples from the set of outcomes. In an instance in which the convergence criteria condition is not satisfied, the processing circuitry is configured to supplement the set of outcomes by repeatedly performing the one or more functions upon randomly sampled input parameter distributions. In contrast, in an instance in which the convergence criteria condition is satisfied, the processing circuitry is configured to determine whether the set of outcomes has been supplemented prior to satisfying the convergence criteria condition and, in an instance in which the set of outcomes has not been supplemented, the processing circuitry is configured to reduce the size of the set of outcomes to be generated during a subsequent Monte Carlo simulation. By reducing the size of the set of outcomes to be generated during a subsequent Monte Carlo simulation, the computing system of this example embodiment conserves computational resources and time such that the computing system operates more efficiently while still generating statistically accurate results.

The processing circuitry of an example embodiment is configured to determine whether the convergence criteria condition is satisfied by repeatedly sampling the set of outcomes to obtain a plurality of samples, determining a statistical parameter representative of the samples and determining whether the convergence criteria condition is satisfied based upon the statistical parameter representative of the samples from the set of outcomes. In this example embodiment, the processing circuitry is configured to determine whether the convergence criteria condition is satisfied based upon the samples of the set of outcomes by determining a confidence interval from the samples from the set of outcomes and determining whether the confidence interval satisfies the convergence criteria condition.

In the instance in which the convergence criteria condition is satisfied and in which the set of outcomes has been supplemented, the processing circuitry is further configured to increase the size of the set of outcomes to be generated during a subsequent Monte Carlo simulation. In this example embodiment, the processing circuitry is configured to increase the size of the set of outcomes to be generated during a subsequent Monte Carlo simulation only in an instance in which the set of outcomes has been supplemented by a number of outcomes that satisfies a supplementation threshold. In the instance in which a convergence criteria condition is not satisfied, the processing circuitry of an example embodiment is further configured to determine whether a stopping criteria condition has been satisfied and to supplement the set of outcomes only in an instance in which the stopping criteria condition has not been satisfied. In an instance in which the stopping criteria condition includes a predefined threshold of outcomes in the set and in which the convergence criteria condition is not satisfied, the processing circuitry of an example embodiment is further configured to determine whether a number of outcomes in the set satisfies the stopping criteria condition including the predefined threshold and to supplement the set of outcomes in an instance in which the number of outcomes fails to satisfy the predefined threshold.

In another example embodiment, a computerized method for dynamically managing Monte Carlo simulations is provided. The method includes identifying a convergence criteria condition and generating, with processing circuitry, a set of outcomes following the repeated performance of one or more functions upon randomly sampled input parameter distributions. The method also includes determining, with the processing circuitry, whether the convergence criteria condition is satisfied based upon a plurality of samples from the set of outcomes. In an instance in which the convergence criteria condition is not satisfied, the method supplements, with the processing circuitry, the set of outcomes by repeatedly performing the one or more functions upon randomly sampled input parameter distributions. In an instance in which the convergence criteria condition is satisfied, the method determines, with the processing circuitry, whether the set of outcomes has been supplemented prior to satisfying the convergence criteria condition and, in an instance in which the set of outcomes has not been supplemented, the method reduces a size of the set of outcomes to be generated during a subsequent Monte Carlo simulation.

The computerized method of an example embodiment determines whether the convergence criteria condition is satisfied by repeatedly sampling the set of outcomes to obtain a plurality of samples, determining a statistical parameter representative of the samples and determining whether the convergence criteria condition is satisfied based upon the statistical parameter representative of the samples from the set of outcomes. In this example embodiment, the method determines whether the convergence criteria condition is satisfied based upon the samples from the set of outcomes by determining a confidence interval from the samples from the set of outcomes and determining whether the confidence interval satisfies the convergence criteria condition.

In the instance in which the convergence criteria condition is satisfied and in which the set of outcomes has been supplemented, the method of an example embodiment increases the size of the outcomes to be generated during a subsequent Monte Carlo simulation. In this example embodiment, the method increases the size of the set of outcomes by increasing the size of the set of outcomes to be generated during the subsequent Monte Carlo simulation only in an instance in which the set of outcomes has been supplemented by a number of outcomes that satisfies a supplementation threshold. The computerized method of an example embodiment also includes determining, in the instance in which the convergence criteria condition is not satisfied, whether a stopping criteria condition has been satisfied and supplementing the set of outcomes only in an instance in which the stopping criteria condition has not been satisfied. In an embodiment in which the stopping criteria condition includes a predefined number of outcomes in the set, the computerized method of an example embodiment also includes determining, in the instance in which the convergence criteria condition is not satisfied, whether a number of outcomes in the set satisfies the stopping criteria condition including the predefined threshold and supplementing a set of outcomes in an instance in which the number of outcomes fails to satisfy the predefined threshold.

In a further example embodiment, a computer program product is provided for dynamically managing Monte Carlo simulations. The computer program product includes a non-transitory computer readable storage medium that includes instructions that, when executed, are configured to identify a convergence criteria condition. The instructions, when executed, are also configured to generate a set of outcomes following the repeated performance of one or more functions upon randomly sampled input parameters distributions. The instructions, when executed, are further configured to determine whether the convergence criteria condition is satisfied based upon a plurality of samples from the set of outcomes. In an instance in which the convergence criteria condition is not satisfied, the instructions, when executed, are also configured to supplement the set of outcomes by repeatedly performing the one or more functions upon randomly sampled input parameter distributions. In contrast, in an instance in which the convergence criteria condition is satisfied, the instructions, when executed, are configured to determine whether the set of outcomes has been supplemented prior to satisfying a convergence criteria condition and, in an instance in which the set of outcomes has not been supplemented, to reduce a size of the set of outcomes to be generated during a subsequent Monte Carlo simulation.

The instructions configured to determine whether the convergence criteria condition is satisfied includes, in an example embodiment, instructions configured to repeatedly sample the set of outcomes to obtain a plurality of samples, instructions configured to determine a statistical parameter representative of the samples and instructions configured to determine whether the convergence criteria condition is satisfied based upon the statistical parameter representative of the samples from the set of outcomes. In this example embodiment, the instructions configured to determine whether the convergence criteria condition is satisfied based upon the samples from the set of outcomes include instructions configured to determine a confidence interval from the set of outcomes and instructions configured to determine whether the confidence interval satisfies the convergence criteria condition.

The non-transitory computer readable storage medium of an example embodiment further includes instructions configured, in the instance in which the convergence criteria condition is satisfied and in which the set of outcomes has been supplemented, to increase the size of the set of outcomes to be generated during a subsequent Monte Carlo simulation. In this example embodiment, the instructions configured to increase the size of the set of outcomes include instructions configured to increase the size of the set of outcomes to be generated during the subsequent Monte Carlo simulation only in an instance in which the set of outcomes has been supplemented by a number of outcomes that satisfies a supplementation threshold. The non-transitory computer readable storage medium of an example embodiment also includes instructions configured, in the instance in which a convergence criteria condition is not satisfied, to determine whether a stopping criteria condition has been satisfied and to supplement the set of outcomes only in an instance in which the stopping criteria condition has not been satisfied.

BRIEF DESCRIPTION OF THE DRAWINGS

Figure 1:
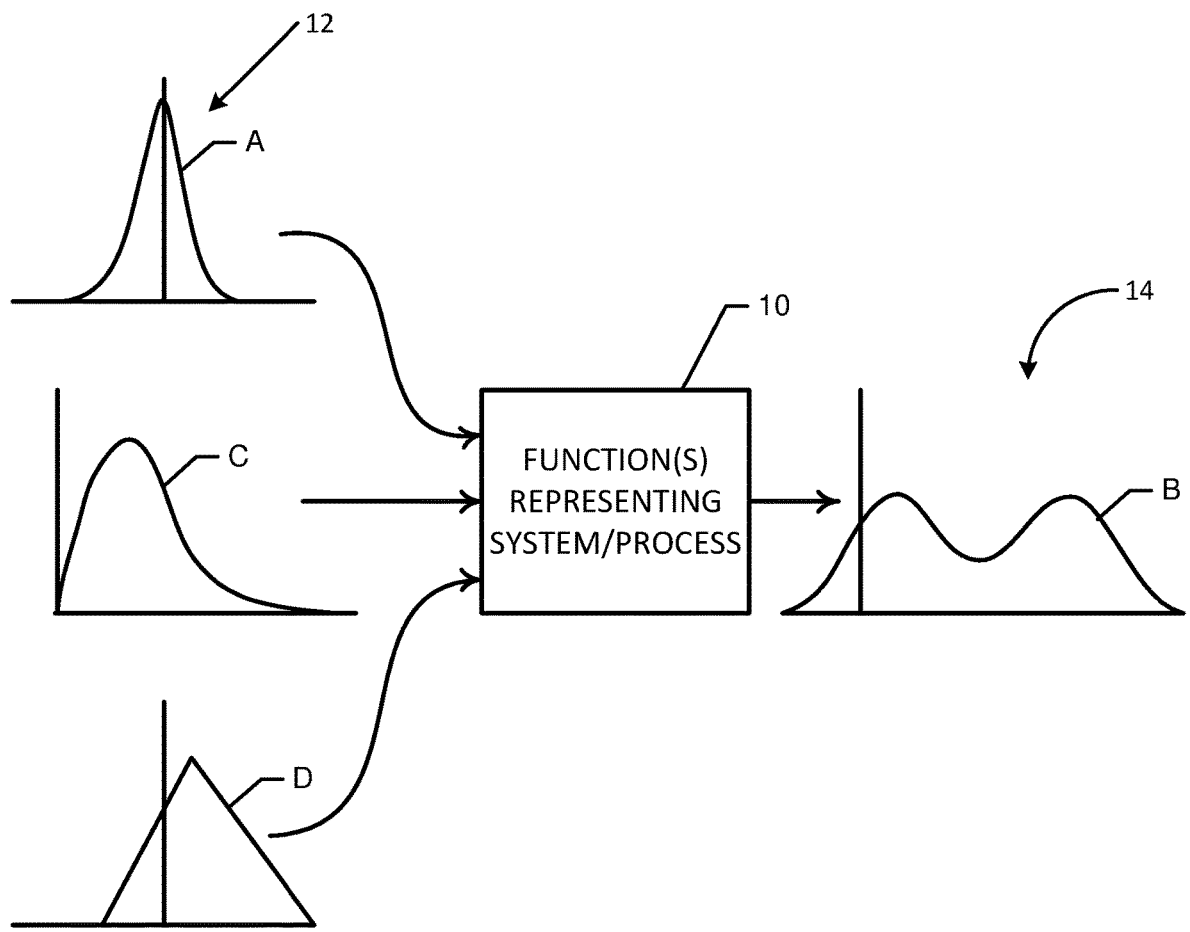
Figure 2:
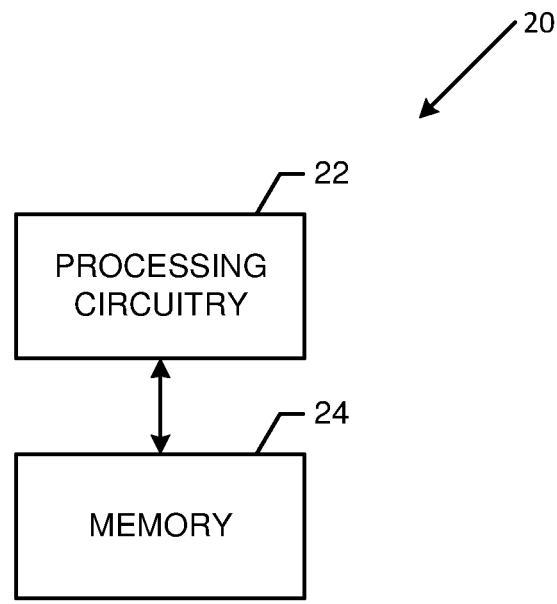
Figure 3:
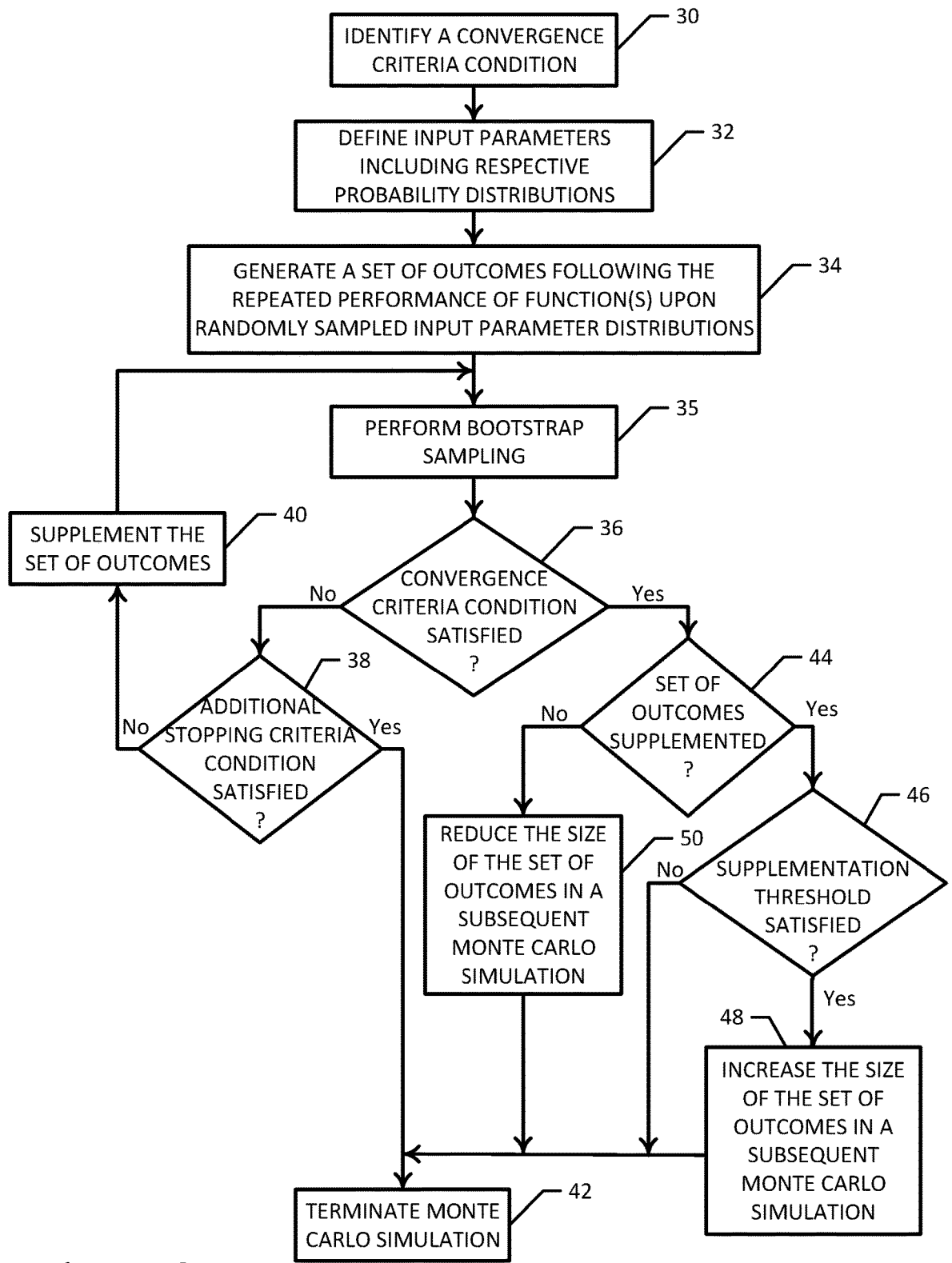
Figure 4:
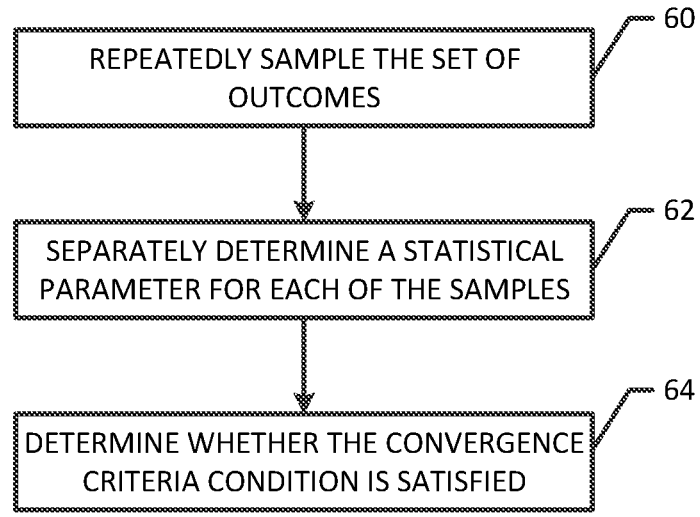
Figure 5:
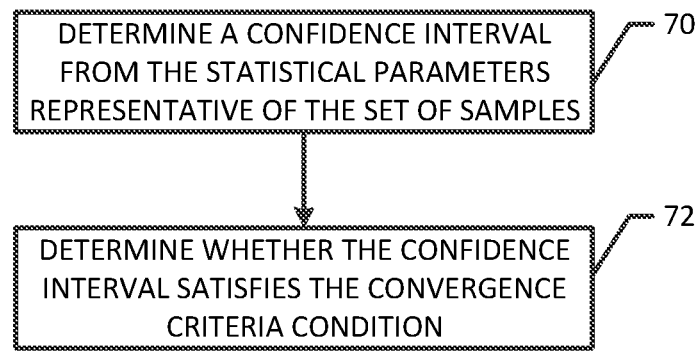

Having thus described certain example embodiments of the present disclosure in general terms, reference will hereinafter be made to the accompanying drawings, which are not necessarily drawn to scale, and wherein:

FIG. 1 represents a complex system or process to be modeled with the system or process receiving a plurality of input parameters represented by respective probability distributions and generating a set of outcomes that is also represented by a respective probability distribution;

FIG. 2 represents a computing system specifically configured in accordance with an example embodiment of the present disclosures;

FIG. 3 is a flow chart illustrating operations performed, such as by the computing system of FIG. 2, in accordance with an example embodiment of the present disclosure;

FIG. 4 is a flow chart illustrating operations performed, such as by the computing system of FIG. 2, in order to determine whether the convergence criteria condition is satisfied in accordance with an example embodiment of the present disclosure; and FIG. 5 is a flow chart illustrating operations performed, such as by the computing system of FIG. 2, in order to determine whether the convergence criteria condition is satisfied based upon samples from the set of outcomes in accordance with an example embodiment of the present disclosure.

DETAILED DESCRIPTION

Some embodiments of the present disclosure will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A computing system, method and computer program product are provided for dynamically managing Monte Carlo simulations. The computing system, method and computer program product insure that a sufficient number of runs are performed such that the set of outcomes are sufficiently statistically accurate to permit a complex system or process that is being modeled to be accurately analyzed. By dynamically managing Monte Carlo simulations, however, the computing system, method and computer program product of an example embodiment produce the statistically accurate set of outcomes in such a manner that the number of runs and, in turn, the computational resources and time required to generate the set of outcomes are conserved. In other words, the computing system, method and computer program product generate a statistically accurate set of outcomes while avoiding the performance of more runs than are unnecessary to generate the statistically accurate set of outcomes.

A Monte Carlo simulation will be generally described herein in conjunction with the modeling of a complex system or process that is, in turn, represented by one or more functions. However, the computing system, method and computer program product of an example embodiment may manage Monte Carlo simulations that are utilized for any of a wide varieties of different purposes. Regardless of the purpose for which a Monte Carlo simulation is deployed, one example representation of a Monte Carlo simulation is shown in FIG. 1. In this regard, a complex system or process that is to be modeled is represented by one or more functions 10. The function(s) 10 are dependent upon one or more input parameters 12 with one or more of the input parameters being represented by a corresponding probability distribution that defines the statistical likelihood of the different values of the respective input parameter. Correspondingly, the one or more functions 10 that are being modeled generate an outcome 14. Since at least one of the input parameters 12 is defined by a probability distribution, the one or more functions 10 generally do not produce an outcome 14 having a single value, but, instead, generate a set of outcomes having different values depending upon the values of the input parameters. Consequently, the set of outcomes 14 generated by the one or more functions 12 that are being modeled may also be represented by a probability distribution. Although FIG. 1 represents the set of outcomes 14 for a single output parameter, the function(s) 10 of another example embodiment may generate a plurality of output parameters, each of which has a respective set of outcomes from the Monte Carlo simulations.

In order to permit a statistically accurate analysis of the complex system or process that is being modeled, the set of outcomes 14 must accurately represent the performance of the complex system or process. However, in order to conserve computational resources and time and to correspondingly permit the computing system to operate more efficiently, the computing system, method and computer program product of an example embodiment manage the Monte Carlo simulation to guard against the performance an excessive number of runs that are unnecessary, that is, that are more than necessary in order to generate statistically accurate results.

In FIG. 2, a computing system 20 configured in accordance with an example embodiment in order to dynamically manage Monte Carlo simulations is depicted. While the computing system 20 may be configured in various manners and may include one or more additional components including, for example, a communication interface, a user interface or the like, the computing system of the illustrated embodiment includes, is associated with or is otherwise in communication with processing circuitry 22 and a memory device 24. In some embodiments, the processing circuitry 22 may be in communication with the memory device 24 via a bus for passing information among components of the computing system 20. The memory device 24 may be non-transitory and may include, for example, one or more volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device such as the processing circuitry 22). The memory device 24 may be configured to store information, data, content, applications, instructions, or the like for enabling the computing system 20 to carry out various functions in accordance with an example embodiment of the present disclosure. For example, the memory device 24 could be configured to buffer input data for processing by the processing circuitry 22. Additionally or alternatively, the memory device 24 could be configured to store instructions for execution by the processing circuitry 22.

The processing circuitry 22 may be embodied in a number of different ways. For example, the processing circuitry 22 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, the processing circuitry 22 may be configured to execute instructions stored in the memory device 24 or otherwise accessible to the processing circuitry. Alternatively or additionally, the processing circuitry 22 may be configured to execute hard coded functionality. As such, whether configured by hardware or software methods, or by a combination thereof, the processing circuitry 22 may represent an entity (e.g., physically embodied in circuitry) capable of performing operations according to an embodiment of the present disclosure while configured accordingly. Thus, for example, when the processing circuitry 22 is embodied as an ASIC, FPGA or the like, the processing circuitry may be specifically configured hardware for conducting the operations described herein. Alternatively, as another example, when the processing circuitry 22 is embodied as an executor of instructions, the instructions may specifically configure the processor to perform the algorithms and/or operations described herein when the instructions are executed. The processing circuitry 22 may include, among other things, a clock, an arithmetic logic unit (ALU) and logic gates configured to support operation of the processing circuitry.

Referring now to FIG. 3, the operations performed, such as by the computing system 20 of FIG. 2, in accordance with an example embodiment of the present disclosure in order to manage Monte Carlo simulations are depicted. As shown in block 30 of FIG. 3, the computing system 20, such as the processing circuitry 22, is configured to identify a convergence criteria condition, such as based upon user input. As described hereinafter, the convergence criteria condition may be compared to the set of outcomes generated during the performance of a Monte Carlo simulation in order to determine whether a sufficient number of outcomes has been generated for the set of outcomes to permit statistically accurate analysis of the underlying complex system of processes being modeled. As such, a convergence criteria condition describes the stability of the simulation with satisfaction of the convergence criteria condition indicating that the simulation has been run enough that an output parameter of interest will not change appreciably if additional runs are performed. A wide variety of convergence criteria conditions may be established by a user and received by the processing circuitry 22 for storage, for example, by the memory device 24. In one example, the convergence criteria condition is the maximum width of a confidence interval, such as in terms of a predefined percentage of deviation of the confidence interface, about a statistical parameter constructed from a predefined number of samples from the set of outcomes in an instance in which the Monte Carlo simulation may be concluded and the set of outcomes may be considered to be statistically accurate. The confidence interval defines range in which a predefined percentage of the samples from the set of outcomes lie. By way of example, but not of limitation, the convergence criteria condition may be that the width of a confidence interval, such as a 90% or a 95% confidence interval, may be no greater than a predefined percentage, such as 5% or 10%, of a statistical parameter, such as the mean, constructed from 10,000 bootstrap samples of the set of outcomes in order to determine that the set of outcomes are statistically accurate. Additional or alternative examples of a convergence criteria condition include the variance or standard deviation of the bootstrap samples satisfying, such as by being less than, a predefined value, the width of a confidence interval constructed from the bootstrap samples, such as a confidence interval about a mean, a proportion, a quantile, etc., being no wider than a predefined value, and/or a coefficient of variation satisfying, such as by being less than, a predefined value.

In some embodiments, an additional stopping criteria condition may be defined, such as by the user, and received by the processing circuitry 22 and optionally stored by the memory device 24 in order to define instances in which the Monte Carlo simulation is to be terminated even though the convergence criteria condition has not been satisfied. For example, the additional stopping criteria condition may include a time limit representing the maximum time that the Monte Carlo simulation may run prior to termination of the Monte Carlo simulation regardless of the satisfaction of the convergence criteria condition. In one example embodiment, the time limit is 24 hours; however, any time limit may be established depending upon the design of the Monte Carlo simulation and the available computing resources. Additionally or alternatively, the additional stopping criteria condition may include a predefined threshold representing the maximum number of outcomes in the set of outcomes generated by the Monte Carlo simulation. Thus, in an instance in which the number of outcomes equals or exceeds the predefined threshold, the Monte Carlo simulation may be terminated regardless of the satisfaction of the convergence criteria condition. While the predefined threshold may be any desired value, the predefined threshold of one example embodiment is 100,000 outcomes representative of 100,000 runs of the Monte Carlo simulation. Additional or different stopping criteria condition(s), such as a maximum number of runs and/or a maximum amount of memory, e.g., disc space, consumed to store the plurality of outcomes, may also be established in other embodiments in order to control the termination of the Monte Carlo simulation regardless of the satisfaction of the convergence criteria condition.

The computing system 20, such as the processing circuitry 22, may also be configured to receive one or more additional parameters for storage, for example, by the memory device 24. For example, a minimum number N of runs of the Monte Carlo simulation that must be performed prior to initially evaluating the convergence statistics as described below may be defined. Additionally or alternatively, the number $n_a$ of runs that are to be executed in each iteration between the evaluation of the convergence statistics as described below may also be defined. The computing system 20, such as the processing circuitry 22, receives or otherwise defines the input parameters 12 including the probability distributions associated with the input parameters as well as one or more functions 10 that are being modeled by the Monte Carlo simulation and which act upon the input parameters. See block 32 of FIG. 3.

The computing system 20, such as the processing circuitry 22, is then configured to generate a set of outcomes 14 following the repeated performance of one or more functions 10 upon randomly sampled input parameter distributions. See block 34 of FIG. 3. In other words, the computing system 20, such as the processing circuitry 22, performs a number of runs of the Monte Carlo simulation. In each run, a value for each of the input parameters 12 is selected, such as by drawing a value of a respective input parameter from and in accordance with the probability distribution for the respective input parameter. Once the values for the input parameters 12 have been selected, the computing system 20, such as the processing circuitry 22, generates a respective outcome 14 from the one or more functions 10 representative of the complex system or process being modeled and operating upon the values of the respective input parameters. Each run of the Monte Carlo simulation generates an additional outcome 14 with at least some of the outcomes being different than other outcomes as different values of the input parameters 12 are drawn from the probability distributions as defined by the respective input parameters. As such, the computing system 20, such as the processing circuitry 22, aggregates the outcomes 14 and generates a set of outcomes representative of the performance of the complex system or process being modeled as the input parameters 12 vary in accordance with the respective input parameter distributions. The set of outcomes 14 may be stored, for example, by memory device 24.

As shown in blocks 35 and 36 of FIG. 3, the computing system 20, such as the processing circuitry 22, is also configured to perform bootstrap sampling of the set of outcomes 14 and to then determine whether the convergence criteria condition is satisfied based upon a plurality of samples from the set of outcomes that has been generated. In some embodiments, a minimum number N of runs that must be executed before evaluating the convergence statistics. In this example embodiment, the Monte Carlo simulation is repeated until the number of runs equals the minimum number N of runs. In other embodiments in which a minimum number N of runs is not established in advance, the computing system 20, such as the processing circuitry 22, may determine whether the convergence criteria condition is satisfied after each run or after some number of runs.

Although the computing system 20, such as the processing circuitry 22, may be configured to determine whether the convergence criteria condition is satisfied in various manners, the computing system, such as the processing circuitry, of an example embodiment depicted in FIG. 4 is configured to determine whether the convergence criteria condition is satisfied based upon the bootstrap sampling of the set of outcomes 14 by repeatedly sampling the set of outcomes and, for each of the samples from the set of outcomes, determining a statistical parameter representative of the samples. See blocks 60 and 62. Each sample from the set of outcomes may, in turn, include one or a plurality of values drawn from the set of outcomes. The sampling of the set of outcomes may be performed in various manners, but, in one embodiment, is performed in accordance with the convergence criteria condition and the additional parameters that have been defined. With reference to the example of the convergence criteria condition provided above, the set of outcomes may be sampled 10,000 times with the outcome that is drawn from the set of outcomes during a respective sampling being returned to the set of outcomes or otherwise remaining within the set of outcomes during subsequent sampling of the set of outcomes. In other words, the sampling of the set of outcomes that is performed in an example embodiment is random sampling with replacement, that is, bootstrap sampling. The statistical parameter that is determined may be any of a variety of different statistical parameters, such as the variance, the standard deviation, the quartile or the like. In an example embodiment, the convergence criteria condition that is defined also serves to define the statistical parameter. In the foregoing example, the statistical parameter is the mean such that the computing system 20, such as the processing circuitry 22, of this example embodiment determines the mean representative of the samples e.g., the 10,000 samples, from the set of outcomes.

In this example embodiment, the computing system 20, such as the processing circuitry 22, is also configured to determine whether the convergence criteria condition is satisfied based upon the statistical parameter determined from the samples from the set of outcomes. See block 64 of FIG. 4. In an example in which the convergence criteria condition has been defined in advance, the statistical parameter that is representative of the samples from the set of outcomes may be utilized to determine if the convergence criteria condition satisfied.

In an example embodiment depicted in FIG. 5, the computing system 20, such as the processing circuitry 22, is configured to determine whether the convergence criteria condition is satisfied based upon the samples from the set of outcomes by determining a confidence interval from the samples from the set of outcomes and then determining whether the confidence interval satisfies the convergence criteria condition. See blocks 70 and 72. In the foregoing example, the computing system 20, such as the processing circuitry 22, is configured to determine whether the convergence criteria condition is satisfied by determining whether the width of the 95% confidence interval of the means meets the convergence criteria condition. In an instance in which the convergence criteria condition is satisfied, a sufficient number of runs has generally been conducted such that the resulting set of outcomes is statistically accurate and the Monte Carlo simulation may be terminated, thereby conserving computational resources and time. However, in instances in which the convergence criteria condition is not satisfied, additional runs are generally conducted unless the evaluation of the additional stopping criteria condition, if any, indicates that the Monte Carlo simulation should be terminated.

In an instance in which the convergence criteria condition is not satisfied, the computing system 20, such as the processing circuitry 22, is configured to supplement the set of outcomes by repeatedly performing the one or more functions 10 upon randomly sampled values from the input parameter distributions 12. See block 40 of FIG. 3. As described above, the computing system 20, such as the processing circuitry 22, of one example embodiment receives or computes an additional parameter defining the number $n_a$ of runs to execute before again evaluating the convergence statistics. Although the number of additional runs may be a constant value, such as provided by a user, the number of additional runs may, instead, be determined analytically, such as based upon a predictive model. In this example embodiment, the computing system, such as the processing circuitry, is configured to supplement the set of outcomes by performing $n_a$ additional runs with each additional run causing the one or more functions 10 to be performed upon randomly sampled values from the input parameter distributions in order to generate an additional outcome to be added to the set of outcomes. Following the completion $n_a$ additional runs of the Monte Carlo simulation, the computing system 20, such as the processing circuitry 22, may again determine whether the convergence criteria condition is satisfied based upon a plurality of samples from the set of outcomes that has now been supplemented with $n_a$ additional outcomes from the additional runs. Depending upon the satisfaction of the convergence criteria condition or the failure to satisfy the convergence criteria condition, the Monte Carlo simulation may be terminated or may be continued in the manner described above.

As noted above, the computing system 20, such as the processing circuitry 22, of an example embodiment is optionally configured to evaluate the additional stopping criteria condition in order to determine whether the Monte Carlo simulation should be terminated regardless of the satisfaction of the convergence criteria condition. As shown in block 38 of FIG. 3, in an instance in which the convergence criteria condition is not satisfied, the computing system 20, such as the processing circuitry 22, of this example embodiment determines whether the additional stopping criteria condition is satisfied. In an instance in which the additional stopping criteria condition is satisfied, the computing system 20 such as the processing circuitry 22, is configured to terminate the Monte Carlo simulation as shown in block 42. However, in an instance in which the additional stopping criteria condition is not satisfied, the computing system 20, such as the processing circuitry 22, is configured to supplement the set of outcomes as described above. See block 40 of FIG. 3.

While a variety of different types of stopping criteria condition(s) may be evaluated and different combinations of the stopping criteria conditions may be evaluated, the computing system 20, such as the processing circuitry 22, of an example embodiment is configured to determine whether a time limit has been reached and/or whether a predefined threshold in terms of the number of outcomes has been reached in order to determine whether to terminate the Monte Carlo simulation regardless of the satisfaction of the convergence criteria condition. In this example embodiment, in an instance in which the convergence criteria condition is not satisfied, the computing system, such as the processing circuitry, is further configured to determine whether the time limit has been satisfied and to supplement the set of outcomes only in an instance in which the time limit has not been satisfied, such as in an instance in which the Monte Carlo simulation has executed for less than 24 hours for an embodiment in which the time limit is set to 24 hours. Additionally or alternatively, in the instance in which the convergence criteria condition is not satisfied, the computing system 20, such as the processing circuitry 22, is further configured to determine whether the number of outcomes in the set of outcomes satisfies a predefined threshold and to supplement the set of outcomes only in an instance in which the number of outcomes fails to satisfy the predefined threshold, such as by being less than the predefined threshold. By imposing such additional stopping criteria condition(s) that are independent of the satisfaction of the convergence criteria condition, the computing system 20, method and computer program product of an example embodiment prevent the Monte Carlo simulation from executing for an excessively long period of time and undesirably consuming additional computing resources and time, such as in an instance in which the convergence criteria condition is such that convergence criteria condition will never be satisfied or will not be satisfied for an inordinately long period of time.

In an instance in which the convergence criteria condition has been satisfied, however, the computing system 20, such as the processing circuitry 22, is configured to provide an output representative of the simulation results, such as the set of outcomes and/or a probability distribution representative of the set of outcomes. The set of outcomes may then be evaluated in order to correspondingly analyze the complex system or process being modeled with there being a high degree of confidence that the set of outcomes accurately represents the performance of the complex system or process as a result of the satisfaction of the convergence criteria condition. In some embodiments, the computing system 20, such as the processing circuitry 22, also provides the number of runs that have been conducted as well as the confidence interval satisfied by the set of outcomes.

In an instance in which the convergence criteria condition has been satisfied, the computing system 20, such as the processing circuitry 22, of an example embodiment not only terminates the Monte Carlo simulation as shown in block 42 of FIG. 3, but is also configured to determine whether the set of outcomes has been supplemented in an effort to satisfy the convergence criteria condition. See block 44 of FIG. 3. As described above, the set of outcomes is supplemented in an instance in which the convergence criteria condition is not initially satisfied, that is, in an instance in which the convergence criteria condition is not satisfied by the set of outcomes from the runs conducted prior to the initial evaluation of the convergence criteria condition and additional runs must be performed in order to generate additional outcomes that are added to the set of outcomes, thereby supplementing the set of outcomes such as described above in conjunction with block 40 of FIG. 3.

In an instance in which the set of outcomes has not been supplemented, that is, in an instance in which the set of outcomes generated by the Monte Carlo simulation prior to initially evaluating the convergence criteria condition was found to satisfy the convergence criteria condition, the computing system 20, such as the processing circuitry 22, is configured to reduce the size of the set of outcomes to be generated during a subsequent Monte Carlo simulation. See block 50 of FIG. 3. In other words, the computing system 20, such as the processing circuitry 22, is configured to reduce the number N of outcomes that are to be initially generated during a subsequent Monte Carlo simulation prior to initially evaluating the convergence criteria condition. As such, computational resources and time may be conserved during the subsequent Monte Carlo simulation by generating fewer outcomes prior to initially evaluating the convergence criteria condition since the analysis of the current Monte Carlo simulation indicates that no more than the initial set of outcomes was required to generate a statistically accurate set of outcomes, thereby leaving open the possibility that a smaller set of outcomes could correspondingly be a statistically accurate representation of the complex system or process being modeled.

However, the computing system 20, method and computer program product also ensure that the set of outcomes is statistically accurate in relation to the complex system or process that is to be modeled. Thus, the computing system 20, such as the processing circuitry 22, of an example embodiment is configured to increase the size of the set of outcomes that is to be generated during a subsequent Monte Carlo simulation in an instance in which the set of outcomes has been supplemented during the current Monte Carlo simulation, that is, in an instance in which the initial set of outcomes did not satisfy the convergence criteria condition and additional runs had to be conducted in order to increase the size of the set of outcomes prior to satisfying the convergence criteria condition. See block 48 of FIG. 3. By increasing the size of the set of outcomes to be conducted during a subsequent Monte Carlo simulation, the computing system 20, method and computing program product of an example embodiment may conduct the subsequent Monte Carlo simulation in a more computationally efficient manner by conducting additional runs prior to pausing to initially evaluate whether the convergence criteria condition has been satisfied.

In order to avoid unnecessarily increasing the size of the set of outcomes, that is, the number of runs to be conducted, prior to initially evaluating the convergence criteria condition, a supplementation threshold may be defined, such as by the user. For example, the supplementation threshold may be defined in terms of a minimum number of additional outcomes that must be added to the set of outcomes that is initially evaluated in order for the supplementation of the set of outcomes to be considered significant. A user may define the supplementation threshold based upon a variety of factors. However, in some embodiments, the supplementation threshold is defined based upon the computing resources available with the supplementation threshold being set to a larger value in instances in which more computing resources are available and/or in instances in which the competing resources are less expensive than in instances in which fewer competing resources are available and/or in instances in which the computing resources are more expensive. In this example embodiment, the computing system 20, such as the processing circuitry 22, is configured to determine whether the supplementation threshold is satisfied and to increase the size of the set of outcomes to be initially generated during a subsequent Monte Carlo simulation, that is, the set of outcomes generated prior to initially evaluating whether the convergence criteria condition is satisfied, only in an instance in which the set of outcomes of the current Monte Carlo simulation has been supplemented by a number of outcomes that satisfies the supplementation threshold. See blocks 46 and 48 of FIG. 3. Thus, the computing system 20, method and computer program product of this example embodiment only increases the size of the initial set of outcomes when the set of outcomes has been significantly supplemented, as opposed to instances in which the set of outcomes has been supplemented to a lesser degree.

As described above, the computing system 20, method and computer program product dynamically manage Monte Carlo simulations to permit a number of runs of a Monte Carlo simulation to be performed that is sufficient to permit statistically accurate analysis of an underlying system or process that is being modeled, but do not require more runs then are necessary to generate the statistically accurate results. Thus, the reliability of the set of outcomes generated by the Monte Carlo simulation is enhanced, while computational resources and time are conserved since the execution of an excessive number of runs of a Monte Carlo simulation may consume substantial computational resources and time. The conservation of computational time and resources by the computing system 20, method and computer program product of an example embodiment reliably and repeatedly generate statistically accurate results while substantially improve the resulting computational efficiency of a Monte Carlo simulation.

As described above, FIGS. 3-5 illustrate flowcharts of a computing system 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of a computing system 20 employing an embodiment of the present invention and executed by a processing circuitry 22 of the computing device. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computing system for dynamically managing Monte Carlo simulations, the computing system comprising:
    a memory device configured to store computer program instructions; and
    processing circuitry configured to execute the computer program instructions, wherein the processing circuitry, in response to execution of the computer program instructions, is configured to:
    identify a convergence criteria condition;
    generate a set of outcomes following a repeated performance of one or more functions upon randomly sampled input parameter distributions;
    determine whether the convergence criteria condition is satisfied based upon a plurality of samples from the set of outcomes;
    in an instance in which the convergence criteria condition is not satisfied, supplement the set of outcomes by repeatedly performing the one or more functions upon randomly sampled input parameter distributions; and
    in an instance in which the convergence criteria condition is satisfied, determine whether the set of outcomes has been supplemented prior to satisfying the convergence criteria condition and, in an instance in which the set of outcomes has not been supplemented, reduce a size of the set of outcomes to be generated during a subsequent Monte Carlo simulation.

2. The computing system of claim 1,
    wherein the processing circuitry is configured to determine whether the convergence criteria condition is satisfied by:
    repeatedly sampling the set of outcomes to obtain a plurality of samples;
    following sampling of the set of outcomes, determining a statistical parameter representative of the samples; and
    determining whether the convergence criteria condition is satisfied based upon the statistical parameter representative of the samples from the set of outcomes.

3. The computing system of claim 2,
    wherein the processing circuitry is configured to determine whether the convergence criteria condition is satisfied based upon the statistical parameter by:
    determining a confidence interval from the samples from the set of outcomes; and
    determining whether the confidence interval satisfies the convergence criteria condition.

4. The computing system of claim 1,
    wherein, in the instance in which the convergence criteria condition is satisfied and in which the set of outcomes has been supplemented, the processing circuitry is further configured to increase the size of the set of outcomes to be generated during a subsequent Monte Carlo simulation.

5. The computing system of claim 4,
    wherein the processing circuitry is configured to increase the size of the set of outcomes to be generated during a subsequent Monte Carlo simulation only in an instance in which the set of outcomes has been supplemented by a number of outcomes that satisfies a supplementation threshold.

6. The computing system of claim 1,
    wherein, in the instance in which the convergence criteria condition is not satisfied, the processing circuitry is further configured to determine whether a stopping criteria condition has been satisfied and to supplement the set of outcomes only in an instance in which the stopping criteria condition has not been satisfied.

7. The computing system of claim 6,
    wherein the stopping criteria condition comprises a predefined threshold of outcomes in the set, and wherein, in the instance in which the convergence criteria condition is not satisfied, the processing circuitry is further configured to determine whether a number of outcomes in the set satisfies the stopping criteria condition including the predefined threshold and to supplement the set of outcomes in an instance in which the number of outcomes fails to satisfy the predefined threshold.

8. A computerized method for dynamically managing Monte Carlo simulations, the computerized method comprising:
    identifying a convergence criteria condition;
    generating, with processing circuitry, a set of outcomes following a repeated performance of one or more functions upon randomly sampled input parameter distributions;
    determining, with the processing circuitry, whether the convergence criteria condition is satisfied based upon a plurality of samples from the set of outcomes;
    in an instance in which the convergence criteria condition is not satisfied, supplementing, with the processing circuitry, the set of outcomes by repeatedly performing the one or more functions upon randomly sampled input parameter distributions; and
    in an instance in which the convergence criteria condition is satisfied, determining, with the processing circuitry, whether the set of outcomes has been supplemented prior to satisfying the convergence criteria condition and, in an instance in which the set of outcomes has not been supplemented, reducing a size of the set of outcomes to be generated during a subsequent Monte Carlo simulation.

9. The computerized method of claim 8,
    wherein determining whether the convergence criteria condition is satisfied comprises:
    repeatedly sampling the set of outcomes to obtain a plurality of samples;
    following sampling of the set of outcomes, determining a statistical parameter representative of the samples; and
    determining whether the convergence criteria condition is satisfied based upon the statistical parameter representative of the samples from the set of outcomes.

10. The computerized method of claim 9,
    wherein determining whether the convergence criteria condition is satisfied based upon the statistical parameter comprises:

determining a confidence interval from the samples from the set of outcomes; and determining whether the confidence interval satisfies the convergence criteria condition.

11. The computerized method of claim 8, further comprising, in the instance in which the convergence criteria condition is satisfied and in which the set of outcomes has been supplemented, increasing the size of the set of outcomes to be generated during a subsequent Monte Carlo simulation.

12. The computerized method of claim 11, wherein increasing the size of the set of outcomes comprises increasing the size of the set of outcomes to be generated during a subsequent Monte Carlo simulation only in an instance in which the set of outcomes has been supplemented by a number of outcomes that satisfies a supplementation threshold.

13. The computerized method of claim 8, further comprising, in the instance in which the convergence criteria condition is not satisfied, determining whether a stopping criteria condition has been satisfied and supplementing the set of outcomes only in an instance in which the stopping criteria condition has not been satisfied.

14. The computerized method of claim 13, wherein the stopping criteria condition comprises a predefined threshold of outcomes in the set, and wherein determining whether the stopping criteria has been satisfied and supplementing the set of outcomes comprises, in the instance in which the convergence criteria condition is not satisfied, determining whether a number of outcomes in the set satisfies the stopping criteria condition including the predefined threshold and supplementing the set of outcomes in an instance in which the number of outcomes fails to satisfy the predefined threshold.

15. A computer program product for dynamically managing Monte Carlo simulations, the computer program product comprising a non-transitory computer readable storage medium including instructions that, when executed, are configured to:

identify a convergence criteria condition;

generate a set of outcomes following a repeated performance of one or more functions upon randomly sampled input parameter distributions;

determine whether the convergence criteria condition is satisfied based upon a plurality of samples from the set of outcomes;

in an instance in which the convergence criteria condition is not satisfied, supplement the set of outcomes by repeatedly performing the one or more functions upon randomly sampled input parameter distributions; and in an instance in which the convergence criteria condition is satisfied, determine whether the set of outcomes has been supplemented prior to satisfying the convergence criteria condition and, in an instance in which the set of outcomes has not been supplemented, reduce a size of the set of outcomes to be generated during a subsequent Monte Carlo simulation.

16. The computer program product of claim 15, wherein the instructions configured to determine whether the convergence criteria condition is satisfied comprise instructions configured to:

repeatedly sample the set of outcomes to obtain a plurality of samples;

following sampling of the set of outcomes, determine a statistical parameter representative of the samples; and determine whether the convergence criteria condition is satisfied based upon the statistical parameter representative of the samples from the set of outcomes.

17. The computer program product of claim 16, wherein the instructions configured to determine whether the convergence criteria condition is satisfied based upon the statistical parameter comprise instructions configured to:

determine a confidence interval from the samples from the set of outcomes; and determine whether the confidence interval satisfies the convergence criteria condition.

18. The computer program product of claim 15, further comprising instructions configured, in the instance in which the convergence criteria condition is satisfied and in which the set of outcomes has been supplemented, to increase the size of the set of outcomes to be generated during a subsequent Monte Carlo simulation.

19. The computer program product of claim 18, wherein the instructions configured to increase the size of the set of outcomes comprise instructions configured to increase the size of the set of outcomes to be generated during a subsequent Monte Carlo simulation only in an instance in which the set of outcomes has been supplemented by a number of outcomes that satisfies a supplementation threshold.

20. The computer program product of claim 15, further comprising instructions configured, in the instance in which the convergence criteria condition is not satisfied, to determine whether a stopping criteria condition has been satisfied and to supplement the set of outcomes only in an instance in which the stopping criteria condition has not been satisfied.

* * * * *